(12) United States Patent
Matuana et al.

(10) Patent No.: US 7,446,138 B2
(45) Date of Patent: Nov. 4, 2008

(54) WOOD PARTICLE FILLED POLYVINYL CHLORIDE COMPOSITES AND THEIR FOAMS

(75) Inventors: Laurent M. Matuana, Holt, MI (US); Patricia A. Heiden, Houghton, MI (US); Bhavesh L. Shah, Webb City, MO (US)

(73) Assignees: Board of Trustees of Michigan State University, East Lansing, MI (US); Michigan Technological University, Houghton, MI (US)

( * ) Notice: Subject to any disclaimer, the term of this patent is extended or adjusted under 35 U.S.C. 154(b) by 0 days.

(21) Appl. No.: 11/408,779

(22) Filed: Apr. 21, 2006

(65) Prior Publication Data

US 2006/0293418 A1    Dec. 28, 2006

Related U.S. Application Data

(60) Provisional application No. 60/676,203, filed on Apr. 29, 2005.

(51) Int. Cl.
*B29C 47/00* (2006.01)
*B29C 43/22* (2006.01)
*B29C 47/60* (2006.01)
*B32B 5/16* (2006.01)
*B29D 7/00* (2006.01)
*C08J 9/00* (2006.01)
*C08J 9/10* (2006.01)
*D01D 5/12* (2006.01)

(52) U.S. Cl. .................. 524/13; 264/45.8; 264/45.9; 264/46.1; 264/54; 264/177.17; 264/210.1; 264/211.21; 264/211.23; 428/323; 428/326

(58) Field of Classification Search .............. 524/13
See application file for complete search history.

(56) References Cited

U.S. PATENT DOCUMENTS

| | | | | |
|---|---|---|---|---|
| 4,059,661 A * | 11/1977 | Eck et al. | | 264/54 |
| 4,434,251 A * | 2/1984 | Sasajima et al. | | 521/50.5 |
| 5,306,550 A * | 4/1994 | Nishiyama et al. | | 442/340 |
| 5,439,628 A * | 8/1995 | Huang | | 264/175 |
| 5,474,723 A * | 12/1995 | Horikoshi | | 264/45.5 |
| 5,688,449 A * | 11/1997 | Fox | | 264/54 |
| 5,725,939 A * | 3/1998 | Nishibori | | 428/292.4 |
| 5,973,035 A * | 10/1999 | Medoff et al. | | 524/13 |
| 5,985,193 A * | 11/1999 | Harrington et al. | | 264/83 |
| 6,280,667 B1 * | 8/2001 | Koenig et al. | | 264/68 |
| 6,342,172 B1 * | 1/2002 | Finley | | 264/45.3 |
| 6,610,409 B2 * | 8/2003 | Pickett et al. | | 428/423.7 |
| 6,784,230 B1 * | 8/2004 | Patterson et al. | | 524/13 |
| 2002/0033563 A1 * | 3/2002 | Gilbert et al. | | 264/557 |
| 2002/0125594 A1 * | 9/2002 | Sung et al. | | 264/40.1 |
| 2003/0030176 A1 * | 2/2003 | Monovoukas et al. | | 264/211 |
| 2003/0036589 A1 * | 2/2003 | Archuletta et al. | | 524/13 |
| 2003/0176538 A1 * | 9/2003 | Wu et al. | | 524/13 |
| 2005/0013984 A1 * | 1/2005 | Dijk et al. | | 428/299.7 |
| 2005/0280176 A1 * | 12/2005 | Ruede | | 264/211 |
| 2006/0061007 A1 * | 3/2006 | Chen et al. | | 264/211.23 |
| 2006/0091578 A1 * | 5/2006 | Bravo et al. | | 264/122 |

OTHER PUBLICATIONS

Frados, Joel ed., Plastics Engineering Handbook of the Society of Plastics Industry, Inc., 1976, Van Nostrand Reinhold Company, 4th Edition, pp. 202-203.*
Xanthos et al., Plastics Processing, 2004, John Wiley and Sons.*
Clemons, C.M., Forest Prod. J., 52(6), 10-18 (2002).
Matuana, L.M., Woodhams, R.T., Balatinecz, J.J. and Park, C.B., Polym. Compos., 19(4), 446-455 (1998).
Matuana, L.M., Balatinecz, J.J., and Park, C.B., Polym. Eng. Sci., 38(5): 765-773 (1998).
Li, W. and Matuana, L.M., J. Appl. Polym. Sci., 88(2), 278-286 (2003).
Matuana, L.M., Park, C.B. and Balatinecz, J.J., J. Vinyl Addit. Technol., 3(4), 265-273 (1997).
Woodhams, R.T., Thomas, G. and Rodgers, D.K., Polym. Eng. Sci., 24: 1166-1177 (1984).
Kokta, B.V., Maldas, D., Daneault, C. and Beland, R., J. Vinyl Technol., 12(3), 146-153 (1990).
Kokta, B.V., Maldas, D., Daneault, C. and Beland, P., Poly. Plast. Technol. Eng., 29 (1-2), 87-118 (1990).
Kokta, B.V., Maldas, D., Daneault, C. and Beland, P., Poly. Compos., 11(2), 84-89 (1990).
Yang, A. and Wu, R., J. Appl. Polym. Sci., 84(3), 486-492 (2002).
Zhang, Q., Liu, L., Ren, L. and Wang, F., J. Appl. Polym. Sci., 64(11), 2127-2130(1997).
Souza Rosa, R.C.R. and Andrade, C.T., J. Appl. Polym. Sci., 92(4), 2706-2713 (2004).
Ratajska, M. and Boryniec, S., Polym. Adv. Technol., 10(10), 625-633 (1999).
Thwe, M.M. and Liao, K., Plast. Rubber Compos., 31(10), 422-431 (2002).
Sato, K., Ota, H. and Omura, Y., Adv. Chitin Sci., 2, 897-901 (1998).
Umemura, K., Inoue, A. and Kawai, S., J. Wood Sci., 49(3), 221-226 (2003).

* cited by examiner

*Primary Examiner*—Mark Eashoo
*Assistant Examiner*—Liam J Heincer
(74) *Attorney, Agent, or Firm*—Ian C. McLeod

(57) ABSTRACT

Extruded composite compositions of PVC and wood particles containing chitosan or chitin as a coupling agent are described. The composite compositions have improved physical and mechanical properties.

5 Claims, 1 Drawing Sheet

WOOD PARTICLE FILLED POLYVINYL CHLORIDE COMPOSITES AND THEIR FOAMS

CROSS-REFERENCE TO RELATED APPLICATIONS

This application relies for priority on U.S. Provisional Application No. 60/676,203, filed Apr. 29, 2005.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The present invention relates to composite compositions which comprise wood particles and polyvinyl chloride (PVC) polymers wherein chitin and/or chitosan are used as natural coupling agents. The resulting composite compositions have improved properties.

(2) Description of the Related Art

Wood-plastic composites (WPCs) have emerged as an important family of engineering materials. They are partially replacing solid pressure-treated wood and other materials in a variety of applications (Clemons, C. M., Forest Prod. J., 52(6), 10-18 (2002). Although WPCs are superior to the unfilled neat polymers in terms of material cost and stiffness, their strength performance (tensile, flexural, and impact) is generally lower than the unfilled polymers (Matuana, L. M., Woodhams, R. T., Balatinecz, J. J. and Park, C. B., Polym. Compos., 19(4), 446-455 (1998); and Matuana, L. M., Balatinecz, J. J., and Park, C. B., Polym. Eng. Sci., 38(5): 765-773 (1998)). The decreased strength is likely a result of the natural incompatibility of phases during the mixing of the hydrophilic wood fibers (high surface tension) with the hydrophobic polymer matrix (low surface tension) (Matuana, L. M., Woodhams, R. T., Balatinecz, J. J. and park, C. B., Polym. Compos., 19(4), 446-455 (1998); Matuana, L. M., Balatinecz, J. J., and Park, C. B., Polym. Eng. Sci., 38(5): 765-773 (1998); Li, W. and Matuana, L. M., J. Appl. Polym. Sci., 88(2), 278-286 (2003); and Matuana, L. M., Park, C. B. and Balatinecz, J. J., J. Vinyl Addit. Technol., 3(4), 265-273 (1997)). Phase incompatibility yields very weak interactions and thus a weak interface (poor interfacial adhesion) between the fiber and the matrix.

One approach to designing WPCs is to modify the wood fiber surface with coupling agents to improve the strength (Woodhams, R. T., Thomas, G. and Rodgers, D. K., Polym. Eng. Sci., 24: 1166-1177 (1984). Coupling agents convert the hydrophilic surface of wood fibers to a more hydrophobic one, thereby reducing the surface tension of wood fibers so that they more closely match that of the molten polymer. As a result, wetting and adhesion are improved via mechanisms such as diffusion and mechanical interlocking between treated fibers and the polymer matrix (Woodhams, R. T., Thomas, G. and Rodgers, D. K., Polym. Eng. Sci., 24: 1166-1177 (1984).

Due to its strong effect in altering the hydrophilic surface of wood fibers to a more hydrophobic one, maleic anhydride functionalized polyolefin is commonly used as an appropriate coupling agent for polyolefin/wood-fiber composites (Li, W. and Matuana, L. M., J. Appl. Polym. Sci., 88(2), 278-286 (2003); and Woodhams, R. T., Thomas, G. and Rodgers, D. K., Polym. Eng. Sci., 24: 1166-1177 (1984)). Similarly, to enhance the interfacial adhesion between wood fibers and PVC matrix, the second largest plastic used to manufacture WPCs, several investigators have assessed the effects of various fiber treatments, including different types of isocyanates, maleic anhydride, silanes, etc. as coupling agents (Kokta, B. V., Maldas, D., Daneault, C. and Beland, R., J. Vinyl Technol., 12(3), 146-153 (1990); Kokta, B. V., Maldas, D., Daneault, C. and Beland, P., Polum. Plast. Technol. Eng., 29(1-2), 87-118 (1990); and Kokta, B. V., Maldas, D., Daneault, C. and Beland, R., Polym. Compos., 11(2), 84-89 (1990)). Most mechanical properties of the composites were improved by these chemical treatments compared to those of composites with non-treated fibers. However, the properties of the composites were inferior to those of the unfilled PVC, suggesting that, unlike polyolefin/wood-fiber composites, the well-known claim of converting the hydrophilic surface of wood-fiber to hydrophobic one is not effective for enhancing the adhesion of PVC to wood-fibers.

Our previous studies, however, demonstrated that when PVC is used as matrix in WPCs, acid-base interactions, in which one phase acts as an electron donor (base) and the other acts as an electron acceptor (acid), are a significant factor in enhancing interfacial adhesion (Matuant, L. M., Woodhams, R. T., Balatinecz, J. J. and Park, C. B., Polym. Compos., 19(4), 446-455 (1998); and Matuana, L. M., Balatinecz, J. J., and Park, C. B., Polym. Eng. Sci., 38(5): 765-773 (1998)). Therefore, surface modification of wood fibers to be used with PVC should be designed to modify the acid-base interactions at the matrix/fiber interface in order to improve the performance of these composites. For Example, by changing the acidic characteristics of wood fibers through surface modification with γ-aminopropyltriethoxy silane, PVC/wood-fiber composite with equal tensile strength and greater modulus than unfilled PVC was developed (Matuana, L. M., Woodhams, R. T., Balatinecz, J. J. and Park, C. B., Polym. Compos., 19(4), 446-455 (1998). The use of the aminosilane successfully modified the wood surface, and facilitated the interaction between the wood and PVC according to Lewis acid-base theory (Matuana, L. M., Woodhams, R. T., Balatinecz, J. J. and Park, C. B., Polym. Compos., 19(4), 446-455 (1998).

In spite of these benefits, γ-amino propyltriethoxy silane has not been extensively used as a coupling agent for PVC/wood-fiber composites, mainly due to its high cost but also due to the difficulty in evenly coating the surface of wood fibers, owing to its sensitivity to hydrolyze and self-condense. Consequently, aminosilane is not a desirable coupling agent in this application.

Chitin (FIG. 1A) is the second most abundant natural polymer after cellulose and is extracted from the shells of crustaceans. Chitosan (FIG. 1B) is the deacetylated form of chitin. These polymers are widely available, non-toxic, biocompatible, and lower in cost than many synthetic coupling agents. The acetyl amine functionality of chitin, and the amine functionality of the chitosan, should permit these polymers to interact with wood and PVC in a manner similar to the aminosilane, and so enhance the interfacial adhesion of between PVC and wood fibers, while potentially improving other properties, and also be more cost-effective.

Several investigators have reported the use of chitin and chitosan with different polymers for various applications (Yang, A. and Wu, R., J. Appl. Polym. Sci., 84(3), 486-492

(2002); Zhang, W., Liu, L., Ren, L. and Wang, F., J. Appl. Polym. Sci., 64(11), 2127-2130 (1997); Souza Rosa, R. C. R. and Andrade, C. T., J. Appl. Polym. Sci., 92(4), 2706-2713 (2004); Ratajska, R. and Boryniec, S., Polym. Adv. Technol., 10(10), 625-633 (1999); Thwe, M. M. and Liao, K., Plast. Rubber Compos., 31(10), 422-431 (2002); Sato, K., Ota, H. and Omura, Y., Adv. Chitin Sci., 2, 897-901 (1997) and Umemura, K., Inoue, A. and Kawai, S., J. Wood Sci., 49(3), 221-226 (2003)). In one study, the interfacial adhesion between chitin fibers and polycaprolactone (PCL) was increased by an irradiation treatment of the composites. The treatment showed an overall increase in mechanical properties of the composite compared to composite prepared from untreated chitin fiber. This increase in interfacial bonding was attributed to a free-radical grafting reaction (Yang, A. and Wu, R., Appl. Polym. Sci., 84(3), 486-492 (2002). Chitosan has also been reported to have been cross-linked to a polymer matrix (Zhang, Q., Liu, K., Ren, L. and Wang, F., J. Appl. Polym. Sci., 64(11), 2127-2130 (1997). That process uses formaldehyde as a cross-linking agent which is a known carcinogen and hazardous to the environment.

Biodegradable composites were also prepared by incorporating chitin flakes ranging from 0-30 wt % into a plasticized starch matrix by an injection molding process. Chitin flakes increased the elastic modulus, tensile stress and water resistance of the composites when compared to the unfilled starch (Souza Rosa, R. C. R. and Andrade, C. T., J. Appl. Polym. Sci., 92(4), 2706-2713 (2004). Biodegradation of the synthetic polymers can also be increased by incorporating a natural biodegradable polymer such as chitosan (Ratajska, M. and Boryniec, S., Polym. Adv. Technol., 10(10), 625-633 (1999).

Chitosan is also used in the wood industry. For Example, chitosan forms a Schiff base when reacted with aldehyde compounds. This property of chitosan can be very useful in reacting with the formaldehyde released from the glue line of plywood, thus reducing the overall emission of formaldehyde to the environment. Hence, the chitosan can be used as a functional coating reagent for wood (Sato, K., Ota, H. and Omura, Y., Adv. Chitin Sci., 2, 897-901 (1997). The use of chitosan as an environmentally friendly adhesive for wood has also been reported in the literature. Glue made from chitosan showed excellent water resistance and was proposed as a replacement for synthetic adhesives (Umemura, K., Inoue, A. and Kawai, S., J. Wood Sci., 49(3), 221-226 (2003).

The prior art has not disclosed the use of chitin or chitosan as adhesion promoters in PVC/wood-fiber composites.

OBJECTS

It is an object of the present invention to provide chitin or chitosan as coupling agents for PVC/wood-fiber composite compositions and their foamed counterparts. It is further an object of the present invention to provide cost effective and composite compositions which are readily prepared using conventional apparatus.

These and other objects will become increasingly apparent by reference to the following description and the drawings.

SUMMARY OF THE INVENTION

The present invention relates to a composite composition which comprises an extruded mixture of:

(a) a coupling agent selected from the group consisting of chitin, chitosan and mixtures thereof;

(b) polyvinyl chloride (PVC); and (c) a dried wood flour, wherein the coupling agent is present in an amount up to about 10 percent by weight of the wood flour. Preferably, wherein the wood flour has a particle size between about 1 to 1,000 microns. Further, containing about 30 to 70 percent by weight wood particles. Still further, wherein the composition further comprises an impact modifier, a temperature stabilization agent for binding any HCl generated from the PVC and a lubricant. Further still, as a foam.

Further, the present invention relates to a process for preparing a composite composition which comprises:

(a) blending a mixture of:

(1) a coupling agent selected from the group consisting of chitin, chitosan and mixtures thereof;

(2) polyvinyl chloride (PVC); and (3) a wood flour, wherein the coupling agent is present in an amount up to about 10 percent by weight of the wood flour; and (b) extruding the blended mixture at an elevated temperature between about 150° C. and a decomposition temperature of the PVC or wood to form the composite composition.

Preferably, wherein the extruder has dual screws which are counter-rotating. Most preferably, where as an additional step the extruded composite composition is pressed at an elevated temperature and pressure to provide a shaped product. Preferably, wherein a foaming agent which expands as a gas at the elevated temperatures is provided in the mixture of step (a).

DESCRIPTION OF PREFERRED EMBODIMENTS

Figure 1:
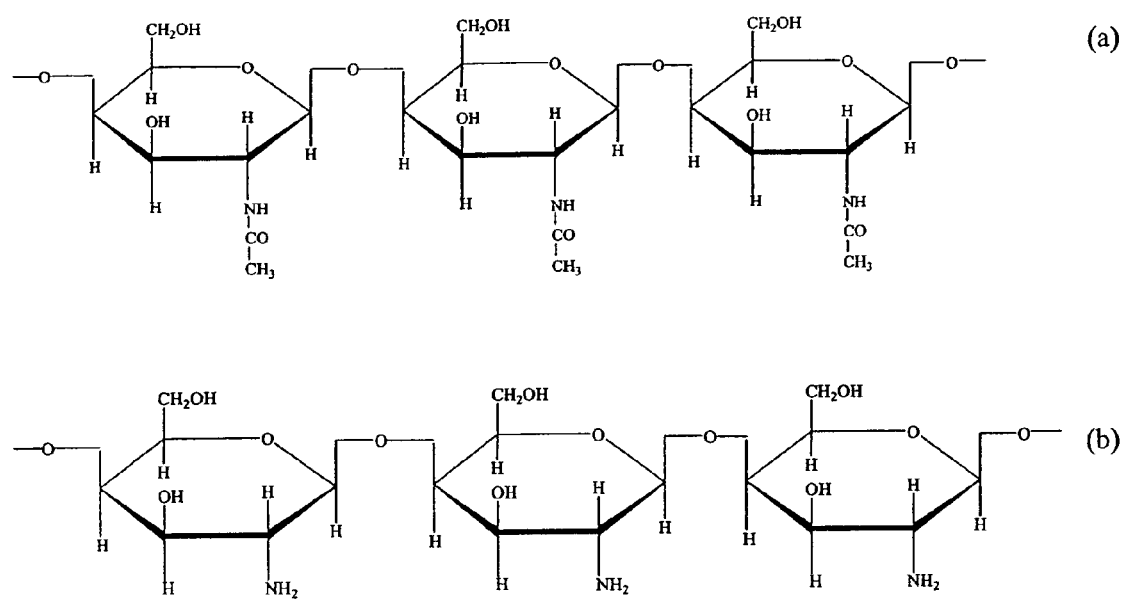
FIG. 1 is a structure of (a) chitin and (b) chitosan.

Effective interfacial adhesion between wood fibers and plastics is crucial for both the processing and ultimate performance of wood plastic composites. Coupling agents are added to wood plastic composites to promote adhesion between the hydrophilic wood surface and hydrophobic polymer matrix, but to date no coupling agent has been reported for PVC/wood-fiber composites that has significantly improved their performance and was also cost-effective. The following Examples show the use of chitin and chitosan, two natural polymers, as novel coupling agents for PVC/wood-flour composites and their foams. Depending on the formulation, the addition of chitin and chitosan coupling agents to PVC/wood flour composites can increase their flexural strength by approximately 50% and their flexural modulus by approximately 30% compared to the PVC/wood flour composite without the coupling agent.

EXAMPLES

Experimental

Materials

Chitin and Chitosan, were used as coupling agents. The coupling agent concentration was varied from 0-10 wt. % based on the weight of the wood flour. PVC (K value-66) was used with 425 microns (40 mesh) size wood flour from a hardwood maple species or a softwood pine species as filler. The wood flour content was varied from 75 to 120 phr. Tin stabilizer was used as a heat stabilizer. Calcium stearate and paraffin wax were used as lubricants. Different acrylic processing aids Paraloid K-120 and Paraloid K-175 were also used in the formulations with impact modifier, Paraloid KM-334. The wood flour was dried in an oven for 48 hrs at 105° C. to a moisture content of less than 1% before compounding and processing. All other chemicals and additives were used as received. The complete formulation is given in Table 1.

TABLE 1

Formulations used in PVC/wood-flour composites.

| Ingredients | Content (phr) |
|---|---|
| PVC K-66 (OxyVinyls) | 100 |
| Tin stabilizer (PlastiStab 2808- from OMG Americas) | 2 |
| Calcium stearate (Synpro, Ferro Corp.) | 1.5 |
| Paraffin wax (Gulf Wax) | 2 |
| Paraloid K-120 (Rohm and Haas Co.) | 2 |
| Paraloid K-175 (Rohm and Haas Co.) | 2 |
| Paraloid KM-334 (Rohm and Haas Co.) | 10 |
| Chitin or Chitosan (TCI America) | Variables[1] |
| Wood flour (American Wood Fibers)[1] | 75, 100, 120 |

[1]The concentrations of chitin and chitosan varied from 0 to 10 wt % based on the weight of wood flour in the composites.

Composite Manufacturing by Compression Molding

All components of the formulation given in Table 1 were added to a high intensity mixer (Papenmeier, TGAHK20) and mixed at room temperature for 10 min. The mixed formulation was then compounded through a 32 mm conical counter rotating twin-screw extruder with an L/D ratio of 13:1 (C. W. Brabender Instruments Inc.) into 10 mm diameter rods. The temperature profile during extrusion was set at 190° C. for all zones and the extrusion speed was maintained at 40 rpm. The extruded rods were compression-molded into panels in a hydraulic press (Erie Mill Co.) at 190° C. for 5 minutes under 6200 KPa pressure. The mold was then cooled to room temperature in a cold press.

Composite Manufacturing by Extrusion

As described earlier, the different additives in the formulation as in Table 1 where weighed and mixed in a high intensity batch mixer for 10 minutes. The mixed batch was then extruded into a rectangular profile of 25.4 mm wide×9.5 mm height in the counter rotating twin screw extruder at 40 rpm. The extruder temperature profile from hopper to die was set at 190-175-170-180° C.

Property Testing

The mechanical properties of the composite were determined by flexural testing in a three-point bending mode. Data were collected on modulus of rupture (MOR or flexural strength) and modulus of elasticity (MOE or flexural stiffness). The samples for flexural testing were cut from the compression molded panels and extruded profile and conditioned in a walk-in conditioning room for 48 hours before testing at 23° C.±2° C. and 50%±5% relative humidity (RH). The flexural test was carried out on an Instron 4206 universal testing machine with series IX software as per ASTM standard D790. The crosshead speed was 1.9 mm/min for a compression molded samples while 4.1 mm/min for an extruded profile samples. At least eight samples were tested for each formulation.

Dynamic mechanical analysis (DMA) was carried out on a Perkin Elmer (DMA 7e) instrument in the three-point bending mode to determine the storage modulus (elastic modulus), loss modulus (viscous modulus) and tan delta of the samples. The test was performed in the temperature sweep mode from 25° C. to 150° C. under a helium atmosphere at a frequency of 1 Hz and at a heating rate of 5° C./min.

Dimensional stability of the samples was measured in terms of water absorption (WA) and thickness swell (ThS). The samples were boiled in water for 2 hours.

Tables 2 to 5 summarize our experimental results.

TABLE 2

Mechanical properties of the PVC/maple-flour composites made with different concentration of coupling agent compared with the control sample (Compression Molded Samples).

| Samples | Flexural Strength (MPa) | Flexural Modulus (GPa) |
|---|---|---|
| Neat PVC | 56.5 ± 3.6 | 2.15 ± 0.12 |
| Composite without coupling agent | 45.4 ± 2.4 | 3.17 ± 0.27 |
| Composite with Chitin[1] | | |
| 2.5 wt. % | 49.0 ± 2.8 | 3.52 ± 0.15 |
| 5 wt. % | 52.4 ± 3.3 | 3.38 ± 0.24 |
| 6.67 wt. % | 54.2 ± 4.7 | 3.67 ± 0.23 |
| 7.5 wt. % | 54.1 ± 2.1 | 3.55 ± 0.25 |
| 10 wt. % | 53.8 ± 1.9 | 3.56 ± 0.17 |
| Composite with Chitosan[1] | | |
| 0.5 wt. % | 53.1 ± 3.9 | 3.50 ± 0.25 |
| 1.0 wt. % | 50.3 ± 2.5 | 3.28 ± 0.22 |
| 1.5 wt. % | 51.8 ± 2.5 | 3.46 ± 0.22 |
| 2.5 wt. % | 50.2 ± 1.7 | 3.38 ± 0.25 |

[1]chitin and chitosan wt. % were based on the weight of the wood flour. The composites without and with chitin/chitosan contained 75 phr wood flour (maple).

TABLE 3

Effect of coupling agent on the dynamic mechanical properties of neat rigid PVC and PVC/wood-flour composites.

| Samples[1] | Storage Modulus, E' (GPa) | | | Loss Modulus, E'' (GPa) | | | Tan δ Peak Max (° C.) |
|---|---|---|---|---|---|---|---|
| | 30° C. | 50° C. | 70° C. | 30° C. | 50° C. | 70° C. | |
| PVC | 2.8 | 2.5 | 1.9 | 0.5 | 0.4 | 0.4 | 90.5 |
| Composite | 4.6 | 3.5 | 2.6 | 0.6 | 0.5 | 0.5 | 88.5 |
| Composite with 6.67 wt. % chitin | 8.0 | 5.9 | 3.8 | 1.3 | 0.9 | 0.8 | 90.9 |
| Composite with 0.5 wt. % chitosan | 6.1 | 5.2 | 3.5 | 1.0 | 0.9 | 0.8 | 90.5 |

[1]Compression molded samples with 75 phr wood flour (maple)

TABLE 4

Mechanical properties of the PVC/maple-flour composites
made with different concentration of coupling agent compared
with the control sample (Extruded Samples).

| Samples[1] | Bending Properties | | | |
|---|---|---|---|---|
| | MOR (MPa) | % change | MOE (MPa) | % change |
| PVC/75 maple flour | | | | |
| No coupling agent (control) | 35.4 ± 2.9 | | 2734 ± 121 | |
| 2.5% chitosan | 44.8 ± 2.7 | 26.6 | 3354 ± 256 | 22.7 |
| 5% chitosan | 47.0 ± 1.8 | 32.8 | 3543 ± 123 | 29.6 |
| 6.67% chitin | 44.8 ± 2.1 | 26.6 | 3302 ± 127 | 20.8 |
| PVC/120 phr maple flour | | | | |
| No coupling agent (control) | 32.9 ± 1.1 | | 3043 ± 55 | |
| 7.5% chitin | 49.4 ± 3.3 | 50.2 | 3781 ± 217 | 24.5 |

[1]chitosan and chitin wt. % were based on the weight of the wood flour.

TABLE 5

Dimensional Stability, i.e., water absorption (WA) and thickness
swell (ThS) of samples boiled in water for 2 hours.

| Samples | Bending Properties | | | |
|---|---|---|---|---|
| | WA (%) | % reduction | ThS (%) | % reduction |
| PVC/75 maple flour | | | | |
| No coupling agent (control) | 13.1 ± 3.5 | | 7.2 ± 0.6 | |
| 5% chitosan | 5.3 ± 0.6 | 59.5 | 4.4 ± 0.2 | 91.7 |
| 6.67% chitin | 8.1 ± 1.3 | 38.2 | 5.3 ± 0.7 | 26.4 |

The following conclusions can be drawn:

The use of chitin and chitosan enhances both the flexural strength and flexural modulus of PVC/wood-flour composites.

Composites containing both chitin and chitosan polymers had a flexural strength greater than the uncoupled composite and rivaling those of neat PVC.

Composites containing both chitin and chitosan polymers had a flexural modulus that exceeded the flexural modulus of both the neat PVC and the uncoupled PVC/wood-flour composite.

Both the storage modulus (E' or elastic component of the material) and the loss modulus (E" or viscous component of the material) increased with the addition of wood flour into PVC matrix, regardless of both the type of coupling agent used and testing temperature.

The addition of wood flour increased the viscosity of the polymer matrix, i.e. the loss modulus E".

Composites prepared with chitin and chitosan showed a greater increase in both storage modulus and loss modulus compared to the uncoupled composite.

The use of both chitin and chitosan improves the water absorption and dimensional stability of the composites.

The glass transition temperature (tan δ peak max) of PVC was not significantly affected when wood flour was added into the PVC matrix.

FOAM EXAMPLES

Wood flour, PVC, chemical foaming agents (CFAs), and coupling agents (chitin and chitosan) are dry-blended in a high intensity mixer (Papenmeier, Type TGAHK20) rotating at 20.3 hp for 5 minutes. Three (3) different forumulations can be made: i) PVC alone, ii) PVC/wood-flour composites without coupling agent, and iii) PVC/wood-flour composites with coupling agent. The addition levels of CFAs, wood flour, and coupling agent can be varied. After blending, the compounded materials are extruded through a single screw or twin-screw extruder (C.W. Brabender) to produce foamed samples. The processing conditions (temperature profile and rotational screw speed) depends on the foaming agent.

After foaming, the extrudates are immediately dipped into a water bath to freeze the foam structure and minimize the deterioration of cells through cell coalescence during bubble growth. The densities of the unfoamed ($\rho_f$) samples can be determined according to ASTM standard D792. The void fraction (VF) or equivalently the density reduction achieved in the samples will be calculated according to the known procedure.

U.S. Published Patent Application 2005/0176836 A1 describes numerous foaming agents which can be used and the disclosure of this application is incorporated herein by reference in its entirety.

It is intended that the foregoing description be only illustrative of the present invention and that the present invention be limited only by the hereinafter appended claims.

We claim:

1. A process for preparing a composite composition which comprises:
   (a) blending a mixture of:
      (1) coupling agent chitin;
      (2) polyvinyl chloride (PVC);
      (3) a dried wood flour with a moisture content of less than 1% by weight, wherein the coupling agent is present in an amount up to about 10 percent by weight of the wood flour; and
      (4) a heat stabilizer for the PVC; and
   (b) extruding the blended mixture at an elevated temperature between about 150° C. and a decomposition temperature of the PVC or wood to form the composite composition with increased dimensional stability based upon water adsorption with a reduction in a percent of thickness swell compared to the composition without the chitin.

2. The process of claim 1 wherein the extruder has dual screws which are counter-rotating.

3. The process of claims 1 or 2 wherein as an additional step the extruded composite composition is pressed at an elevated temperature and pressure to provide a shaped product.

4. The process of claims 1 or 2 wherein a foaming agent which expands as a gas at the elevated temperatures is provided in the mixture of step (a).

5. The process of claim 1 wherein the heat stabilizer is a tin stabilizer.

* * * * *